United States Patent
Jung et al.

(10) Patent No.: US 10,404,412 B2
(45) Date of Patent: Sep. 3, 2019

(54) METHOD FOR INTERWORKING PERFORMED BY BASE STATION AND BASE STATION USING SAME

(71) Applicant: LG ELECTRONICS INC., Seoul (KR)

(72) Inventors: Sunghoon Jung, Seoul (KR); Jaewook Lee, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 77 days.

(21) Appl. No.: 15/323,029

(22) PCT Filed: Jul. 2, 2015

(86) PCT No.: PCT/KR2015/006839
§ 371 (c)(1),
(2) Date: Dec. 29, 2016

(87) PCT Pub. No.: WO2016/003224
PCT Pub. Date: Jan. 7, 2016

(65) Prior Publication Data
US 2018/0175970 A1 Jun. 21, 2018

Related U.S. Application Data

(60) Provisional application No. 62/020,373, filed on Jul. 2, 2014.

(51) Int. Cl.
*H04W 36/00* (2009.01)
*H04L 1/00* (2006.01)
(Continued)

(52) U.S. Cl.
CPC .......... *H04L 1/0071* (2013.01); *H04W 48/18* (2013.01); *H04W 88/10* (2013.01); *H04W 92/02* (2013.01);
(Continued)

(58) Field of Classification Search
CPC .. H04L 1/0071; H04W 84/042; H04W 88/10; H04W 84/12; H04W 88/06; H04W 88/16
See application file for complete search history.

(56) References Cited

U.S. PATENT DOCUMENTS

| | | | | |
|---|---|---|---|---|
| 2011/0116478 | A1* | 5/2011 | Zhang | H04W 36/0055 370/331 |
| 2014/0071925 | A1* | 3/2014 | Liu | H04W 28/08 370/329 |
| 2015/0189551 | A1* | 7/2015 | Ozturk | H04W 28/08 370/235 |

FOREIGN PATENT DOCUMENTS

| | | |
|---|---|---|
| KR | 20130091567 A | 8/2013 |
| KR | 20130116523 A | 10/2013 |
| KR | 20140011624 A | 1/2014 |

OTHER PUBLICATIONS

3GPP; TSG-RAN3 Meeting #84, R3-141042 Use cases for 3GPP-WLAN Interworking, May 19-23, 2014, Seoul, Korea.

* cited by examiner

*Primary Examiner* — Thai Nguyen
(74) *Attorney, Agent, or Firm* — Dentons US LLP

(57) ABSTRACT

Provided are a method for interworking performed by a base station and a base station using the method. A base station of a first network receives, from a core network (CN), bearer characteristics information, and performs interworking with a base station of a second network, based on the bearer characteristics information. The bearer characteristics information includes information on which network among the first and second networks is more appropriate for providing the bearer.

12 Claims, 19 Drawing Sheets

(51) Int. Cl.
*H04W 88/10* (2009.01)
*H04W 92/02* (2009.01)
*H04W 48/18* (2009.01)
H04W 84/04 (2009.01)
H04W 84/12 (2009.01)
H04W 88/06 (2009.01)
H04W 88/16 (2009.01)

(52) U.S. Cl.
CPC ...... *H04W 36/0066* (2013.01); *H04W 84/042* (2013.01); *H04W 84/12* (2013.01); *H04W 88/06* (2013.01); *H04W 88/16* (2013.01)

FIG. 14
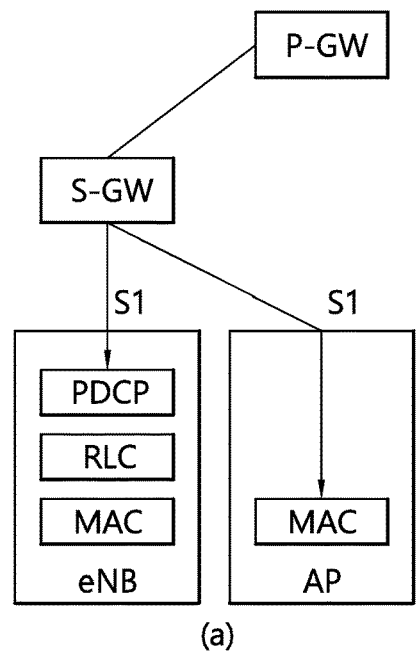
(a)
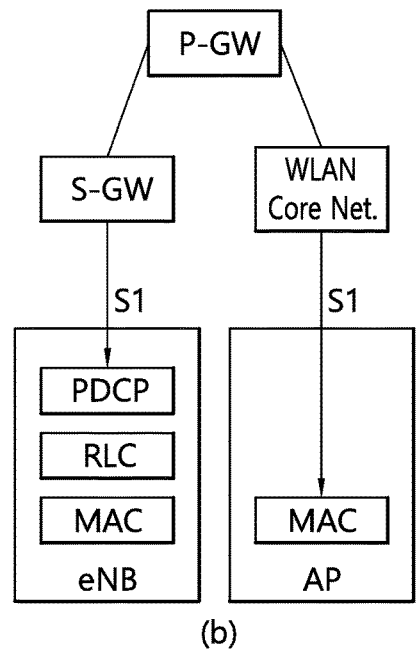
(b)

FIG. 16
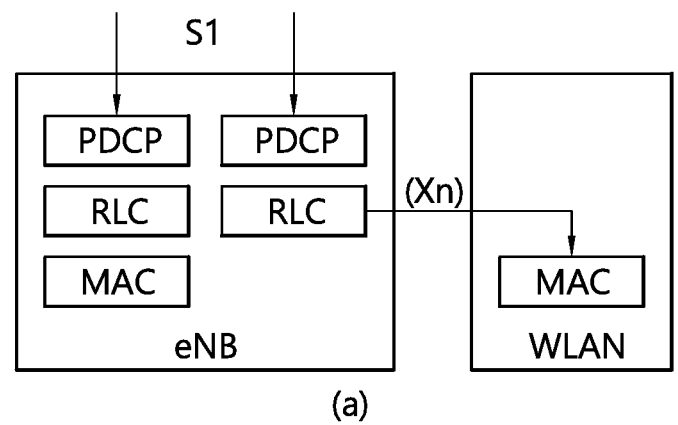
(a)
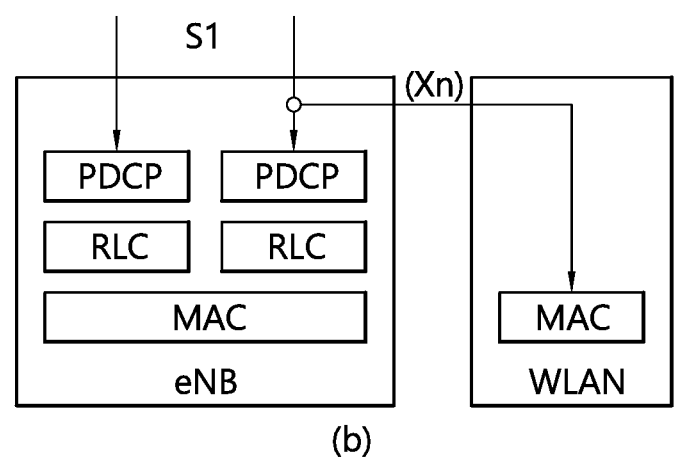
(b)

FIG. 17
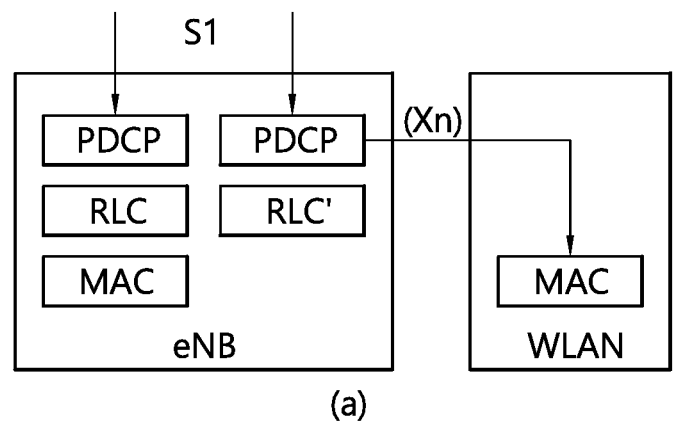
(a)
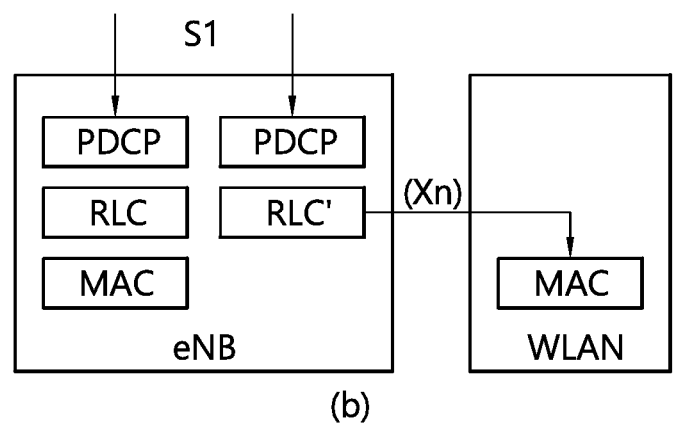
(b)

METHOD FOR INTERWORKING PERFORMED BY BASE STATION AND BASE STATION USING SAME

CROSS-REFERENCE TO RELATED APPLICATIONS

This application is the National Stage filing under 35 U.S.C. 371 of International Application No. PCT/KR2015/006839, filed on Jul. 2, 2015, which claims the benefit of U.S. Provisional Application No. 62/020,373 filed on Jul. 2, 2014, the contents of which are all hereby incorporated by reference herein in their entirety.

BACKGROUND OF THE INVENTION

Field of the Invention

The present invention relates to wireless communication, and more particularly, to an operating method of an eNB for interworking between heterogeneous networks in a wireless communication system and an eNB using the method.

Related Art

3GPP (3rd Generation Partnership Project) LTE (long term evolution), a development of UMTS (Universal Mobile Telecommunication System), was introduced in 3GPP Release 8. 3GPP LTE uses OFDMA (orthogonal frequency division multiple access) for the downlink and SC-FDMA (Single Carrier-frequency division multiple access for the uplink. Recently, there have been discussions about 3GPP LTE-A (LTE-Advanced), which is an evolution of 3GPP LTE.

A wireless communication system may have support for services to UEs over multiple access networks. For example, a UE may receive service from a 3GPP access network, which is a wireless communication system, and also may receive service from a non-3GPP access network, such as WIMAX (Worldwide Interoperability for Microwave Access) or WLAN (Wireless Local Area Network).

A UE may establish a connection with a 3GPP access network to receive a service, and if traffic overload occurs to the 3GPP access network, may handle the traffic over another access network, i.e., a non-3GPP access network, to improve the overall network efficiency. Reversely, a UE connected to a non-3GPP access network may handle traffic using a 3GPP access network for efficiency.

Suppose that there are two different networks: a first network and a second network. Interworking refers to the ability of a UE connected to the first network to access and use resources or services offered by the second network. In the conventional art, the UE is given predetermined rules for interworking and performs interworking according to these rules. That is, a network informs the UE of interworking rules, and the UE performs interworking by itself.

Meanwhile, quality of service (QoS) that is provided or guaranteed may be different between wireless access networks. For example, relatively high QoS may be provided in a fee-paid LTE network, and relatively low QoS may be provided in a free WLAN. Accordingly, if QoS is not taken into consideration when interworking is performed, agreed QoS may not be guaranteed for specific UE.

SUMMARY OF THE INVENTION

An object of the present invention is to provide a method for performing, by an eNB, interworking in a wireless communication system and an eNB using the method.

In an aspect, a method for performing interworking is provided. The method is performed by an eNodeB (eNB) of a first network and comprises receiving bearer characteristic information from a core network (CN), and performing interworking with an eNB of a second network based on the bearer characteristic information, wherein the bearer characteristic information comprises information about whether it is proper to provide a bearer over which one the first and the second networks.

The bearer characteristic information may comprise information indicating whether the bearer needs to be provided over only the first network or whether the bearer needs to be provided over the first network or the second network.

The bearer characteristic information may comprise information indicating whether the bearer needs to be split and provided over the first network and the second network.

The eNB may send interworking-related eNB capability information to the core network, and the interworking-related eNB capability information supports bearer split in which the eNB provides one bearer over a plurality of networks and traffic offloading in which traffic is offloaded from one network to another network.

When handover is generated, the eNB may transfer the bearer characteristic information to a target eNB.

The first network may be a long term evolution (LTE) network, and the second network may be a wireless local area network (WLAN).

The core network may comprise a packet data network-gateway (P-GW).

The bearer may be a data transmission path between UE which is served by the eNB and the P-GW.

The UE may send a preference indicator to the P-GW, and the preference indicator may indicate that the UE prefers that the bearer is provided over which one of the first and the networks.

In another aspect, an eNodeB (eNB) of a first network is provided. The eNB comprises a radio frequency (RF) unit sending and receiving a radio signal and a processor functionally coupled to the RF unit and operating, wherein the processor that receives bearer characteristic information from a core network (CN), and performs interworking with an eNB of a second network based on the bearer characteristic information, wherein the bearer characteristic information comprises information about whether it is proper to provide a bearer over which one the first and the second networks.

In accordance with an embodiment of the present invention, the eNB of a first network receives bearer characteristic information from a core network and performs interworking with a second network based on the bearer characteristic information. The bearer characteristic information includes information for providing a proper bearer to each piece of traffic, for example, a service/programs/IP flow. The eNB may easily determine whether it has to process traffic only through the first network providing relatively high QoS and there is no problem if it processes traffic through the second network providing relatively low QoS based on the bearer characteristic information. Accordingly, the eNB of the first network can perform interworking with the second network while guaranteeing QoS.

BRIEF DESCRIPTION OF THE DRAWINGS

FIG. 14 to FIG. 18 represent an interworking architecture of a first network (LTE) and s second network (WLAN).

DESCRIPTION OF EXEMPLARY EMBODIMENTS

Figure 1:
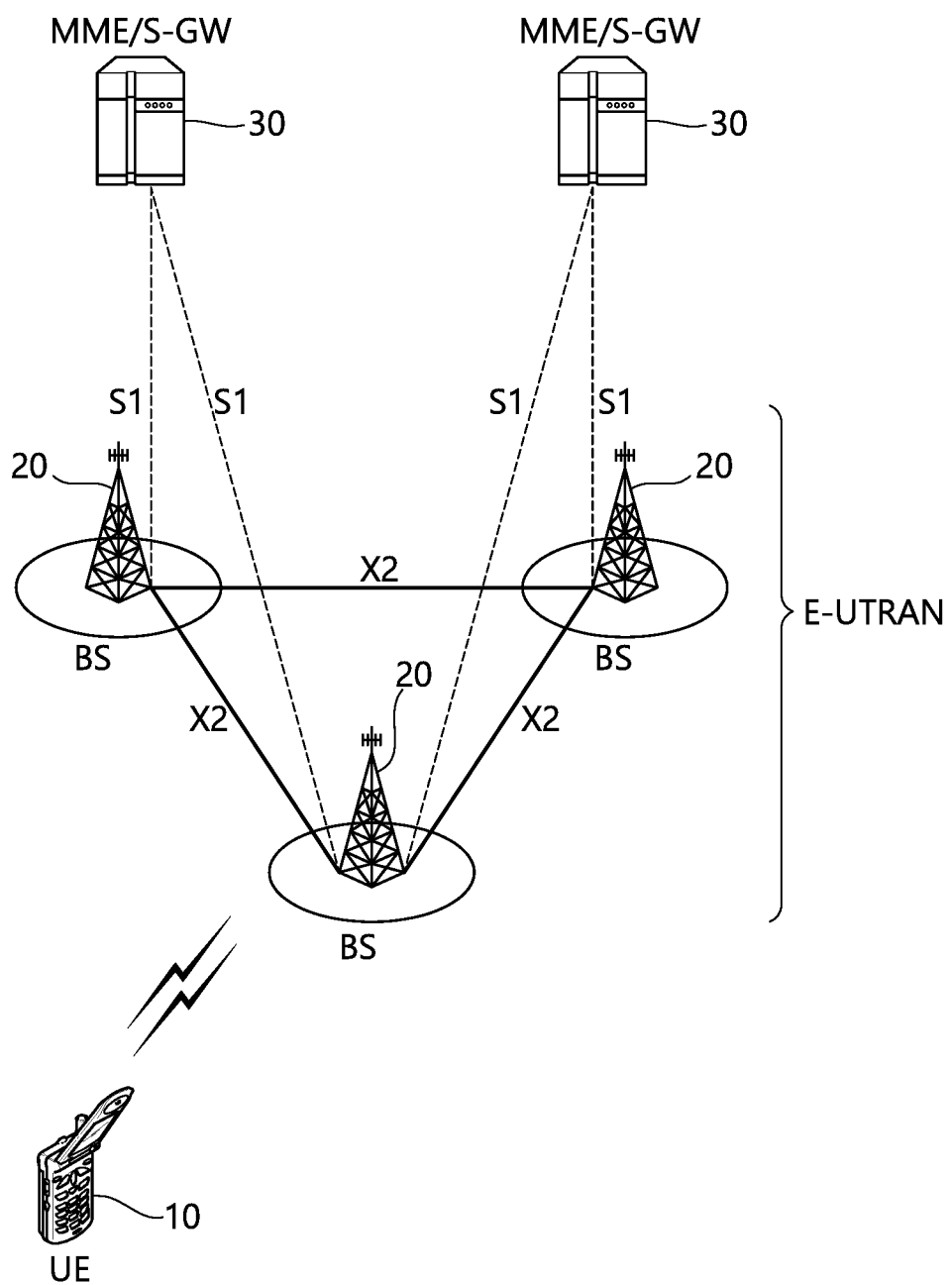
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
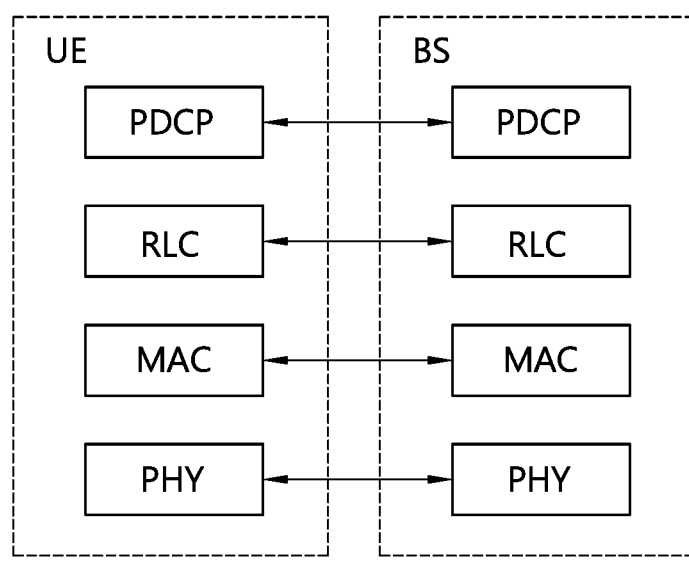
FIG. 2 is a diagram showing a wireless protocol architecture for a user plane.
Figure 3:
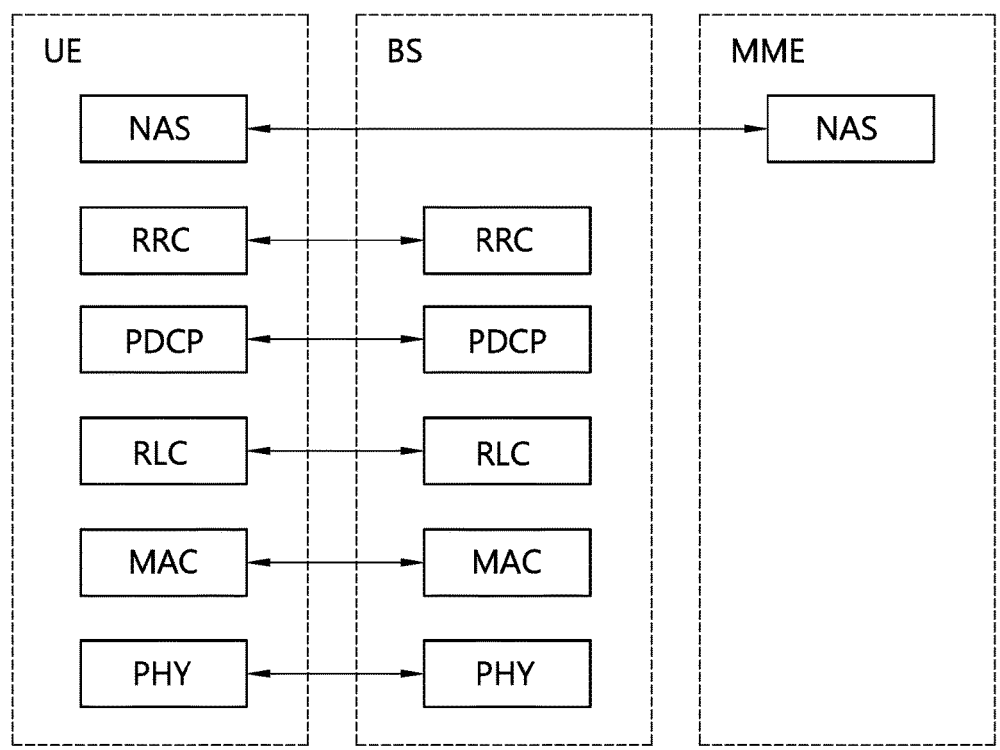
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

As set forth in 3GPP, physical channels, in 3GPP LTE, may be divided into data channels, such as a PDSCH (Physical Downlink Shared Channel) and a PUSCH (Physical Uplink Shared Channel), and control channels, such as a PDCCH (Physical Downlink Control Channel), a PCFICH (Physical Control Format Indicator Channel), a PHICH (Physical Hybrid-ARQ Indicator Channel), and a PUCCH (Physical Uplink Control Channel).

The PCFICH, which is transmitted in the first OFDM symbol of the sub-frame, carries a CIF (control format indicator) regarding the number of OFDM symbols (i.e., size of the control region) used for transmission of control channels in the sub-frame. The UE receives the CIF over the PCFICH and then monitors the PDCCH.

The PDCCH is a downlink control channel, and is also called a scheduling channel in a sense that it carries scheduling information. The control information transmitted through the PDCCH is referred to as downlink control information (DCI). The DCI may include resource allocation of the PDSCH (also referred to as DL (downlink) grant), resource allocation of the PUSCH (also referred to as UL (uplink) grant), set of transmit power control commands for individual UEs in any UE group and/or VoIP (Voice over Internet Protocol) activation.

In 3GPP LTE, blind decoding is used for detecting the PDCCH. Blind decoding is a scheme in which a desired identifier is demasked to the CRC of a received PDCCH (referred to as a candidate PDCCH) and CRC error check is conducted so as to identify whether the corresponding PDCCH is its own control channel.

After determining the PDCCH format according to the DCI to be sent to the UE, the base station adds a CRC (Cyclic Redundancy Check) to the DCI and masks the CRC with a unique identifier (which is referred to as RNTI (Radio Network Temporary Identifier)) depending on the owner or purpose of the PDCCH.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a procedure of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
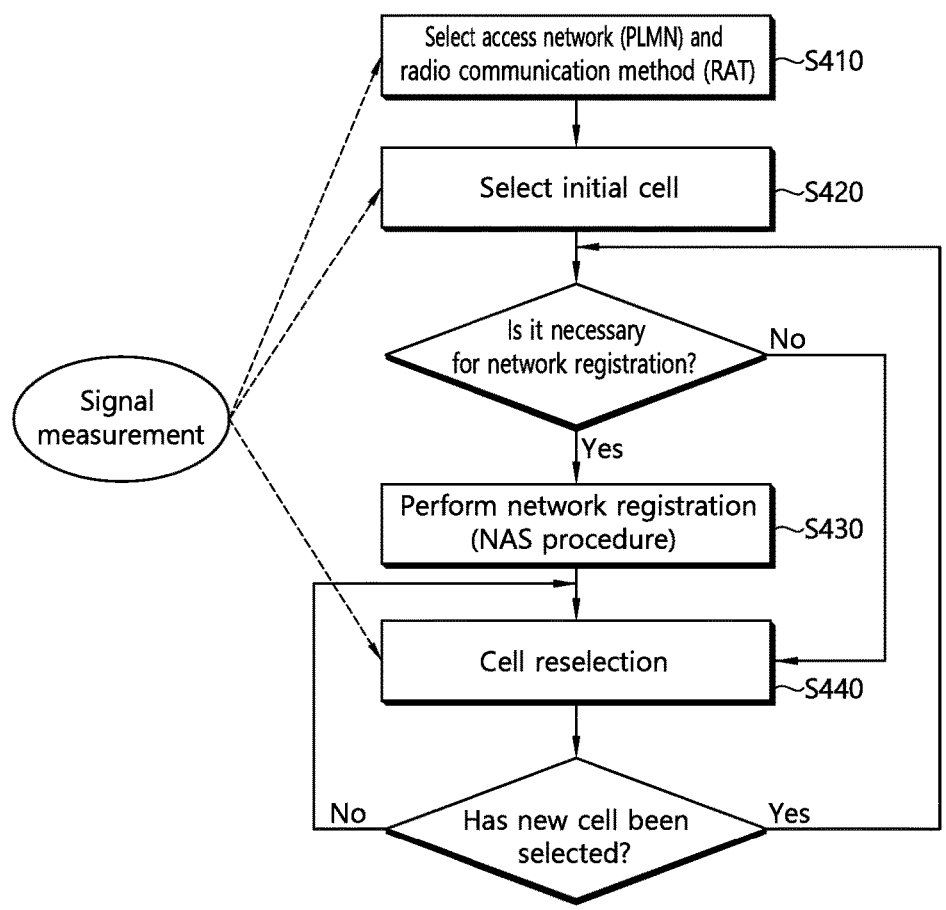
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection procedure, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This procedure is called cell reselection differently from the initial cell selection of the No. 2 procedure. In this case, temporal restriction conditions are placed in order for a cell to be frequently reselected in response to a change of signal characteristic. A cell reselection procedure is described later in detail.

Figure 5:
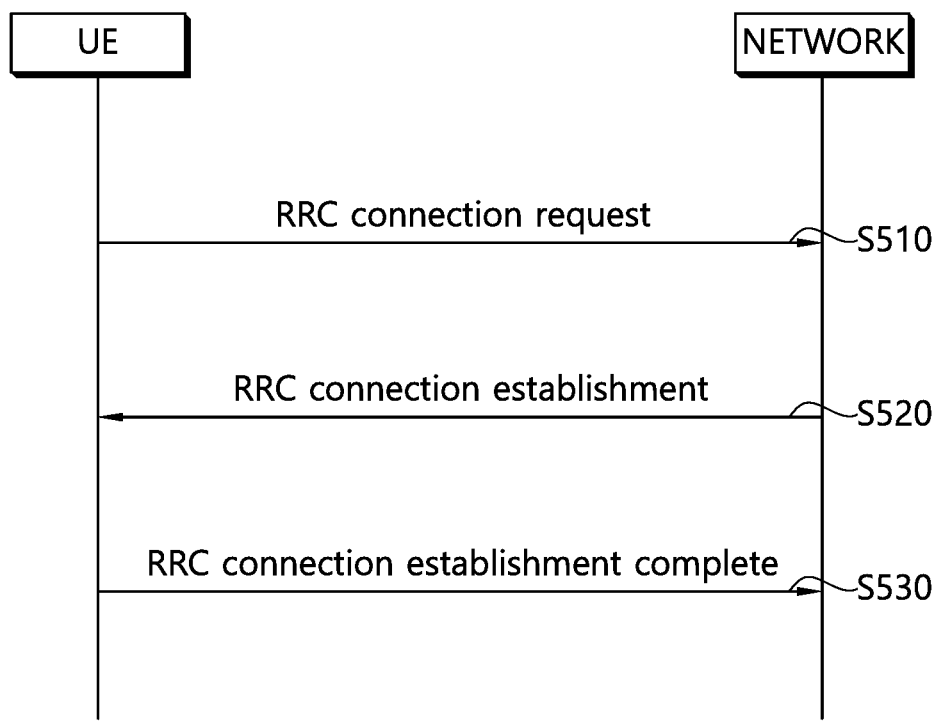
FIG. 5 is a flowchart illustrating a procedure of establishing RRC connection.

FIG. 5 is a flowchart illustrating a procedure of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
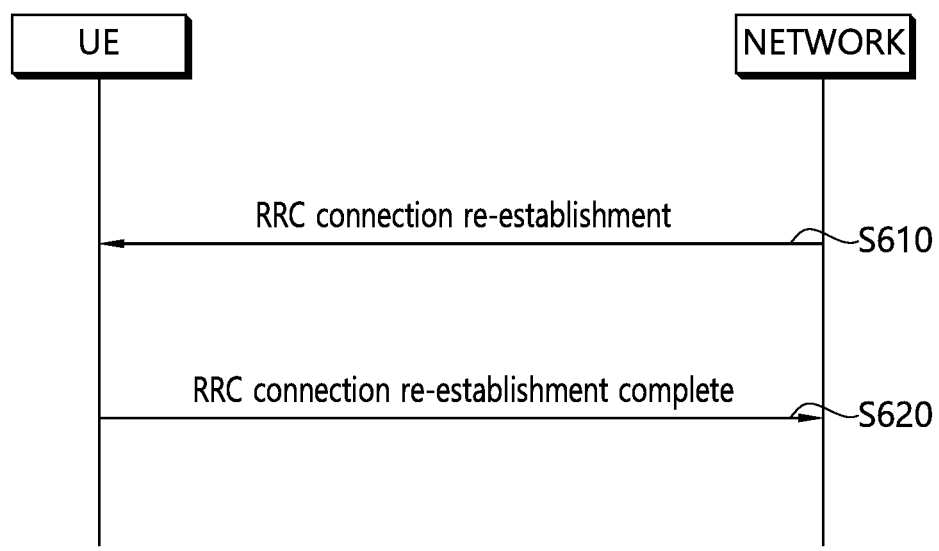
FIG. 6 is a flowchart illustrating an RRC connection reconfiguration procedure.

FIG. 6 is a flowchart illustrating an RRC connection reconfiguration procedure. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP.

A cell selection procedure is basically divided into two types.

The first is an initial cell selection procedure. In this procedure, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection procedure. If the UE has only to search for a cell that satisfies the cell selection criterion, the UE selects the corresponding cell. If a suitable cell that satisfies the cell selection criterion is not retrieved though such a procedure, the UE performs an initial cell selection procedure.

A cell selection criterion may be defined as in Equation 1 below. Following Equation 1 can be referred to as measurement for determining whether or not S-criterion is satisfied.

$$\text{Srxlev} > 0 \text{ AND } \text{Squal} > 0, \quad \text{[Equation 1]}$$

where:

$$\text{Srxlev} = Q_{rxlevmeas} - (Q_{rxlevmin} + Q_{rxlevminoffset}) - P_{compensation},$$

$$\text{Squal} = Q_{qualmeas} - (Q_{qualmin} + Q_{qualminoffset})$$

In this case, in Equation 1, the variables may be defined as in Table 1 below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

$Q_{rxlevminoffset}$ and $Q_{qualminoffset}$, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection procedure, the intensity or quality of a signal between the UE and a BS may be changed due to the mobility of the UE or a change of a radio environment. Accordingly, if the quality of the selected cell is changed, the UE may select another cell providing better quality. After the UE selects a specific cell through the cell selection procedure, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a procedure is called cell reselection. In general, a basic object of the cell reselection procedure is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection procedure compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on.

Inter-RAT cell reselection: UE reselects a cell that uses RAT different from RAT on which the UE camps The principle of a cell reselection procedure is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Figure 7:
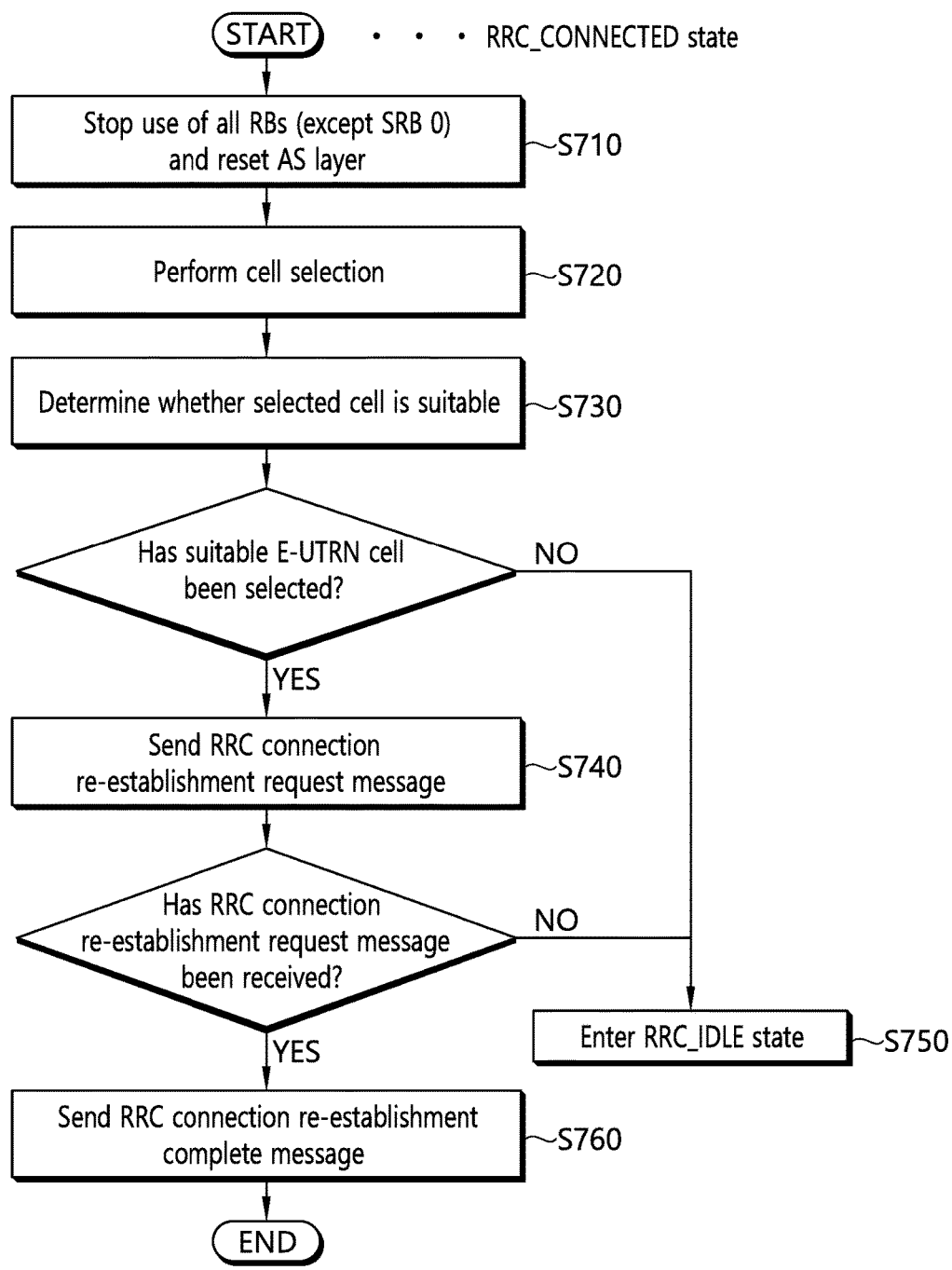
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Hereinafter, interworking between a 3GPP access network and another access network will be described.

In 3GPP, ANDSF (Access Network Discovery and Selection Functions) for discovering and selecting connectable access networks were standardized since interworking with non-3GPP access networks (e.g., WLAN) was first introduced in Release 8. An ANDSF provides discovery information (e.g., WLAN and WiMAX locations), which is a list of networks that may be available in the vicinity of the UE, inter-system mobility policies (ISMP), which reflect an operator's policies, and an inter-system routing policy. Based on this information, the UE may determine which traffic and which access network it will transmit over. The ISMP may include network selection rules for a UE with no more than one active access network connection (e.g., either WLAN or 3GPP). The ISRP may include network selection rules for a UE with potentially more than one active access network connection (e.g., both WLAN and 3GPP). The ISRP includes MAPCON (multiple-access PDN connectivity, IFOM (IP flow mobility), and non-seamless WLAN offloading. OMA DM (Open Mobile Alliance Device Management), etc. is used for dynamic provision between the ANDSF and the UE.

The MAPCON is a standardization of a technology which enables configuring and maintaining multiple packet data network (PDN) connectivity simultaneously through 3GPP access and non-3GPP access, and enables a seamless traffic offloading in units of all active PDN connections. To this end, an ANDSF server provides information, such as access point names (APN) for offloading, a routing rule on the priority order of access networks, a time of day for offloading, and a validity area of access networks for offloading. Offloading may be defined as the transfer of loads/traffic from a first access network to a second access network.

The IFOM supports more flexible and subdivided IP flow mobility and seamless offloading than the MAPCON. As opposed to the MAPCON, a technical feature of the IFOM enables the UE to access a packet data network through different access networks even when connected to the packet data network by using the same access point name (APN), and achieves service provision flexibility by enabling mobility and offloading units to move, not for each packet data network (PDN) but for each specific service IP traffic flow unit. To this end, the ANDSF server provides information, such as an IP flow to be offloaded, a routing rule on the priority order of access networks, a time of day for offloading, and a validity area of access networks for offloading.

The non-seamless WLAN offloading is a technology that does not change the path of specific IP traffic to the WLAN but completely offloads traffic so as not to pass through an EPC. Since this is not anchored to a P-GW for supporting the mobility, the offloaded IP traffic may not be seamlessly moved back to the 3GPP access network. To this end, the ANDSF server provides the UE with information similar to the information provided to perform the IFOM.

Figure 8:
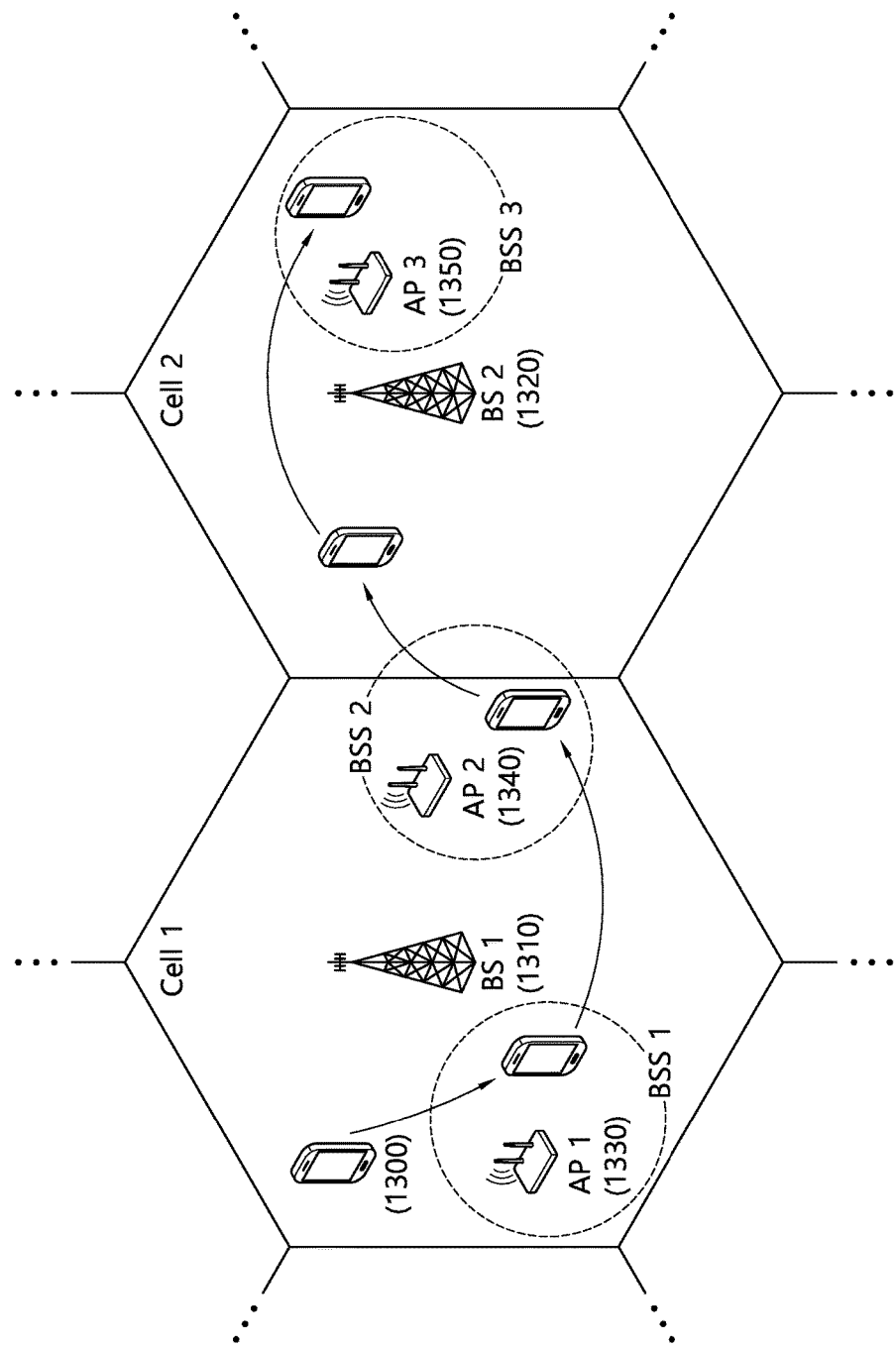
FIG. 8 is a diagram illustrating an example of an environment in which the 3GPP access network and the WLAN access network coexist.

FIG. 8 is a diagram illustrating an example of an environment in which the 3GPP access network and the WLAN access network coexist.

Referring to FIG. 8, as 3GPP access networks, Cell 1 is deployed around Base Station 1 1310, and Cell 2 is deployed around Base Station 2 1320. Also, BSS (Basic Service Set) 1 is deployed around Access Point (AP) 1 1330, BSS 2 is deployed around AP2 1340, and BSS 3 is deployed around AP3 1350 which exists within Cell 2. The coverage of the cells is indicated by solid lines, and the coverage of the BSSs is indicated by dotted lines.

It is assumed that the UE 1300 is configured to perform communication over at least either a 3GPP access network or a WLAN access network. IN this case, the UE 1300 may be called a station.

Initially, the UE 1300 may establish a connection with BS 1 1310 within Cell 1 and handle traffic over a 3GPP access network.

Suppose that the UE 1300 has entered the coverage of BSS 1 while moving within the coverage of Cell 1. In this case, if traffic handling between the UE 1300 and BS 1 1310 is not seamless, or traffic handling is more seamless with the AP 1 1330, the traffic may be transferred from the 3GPP access network to a WLAN access network to ensure efficiency.

The present invention is now described below.

Figure 9:
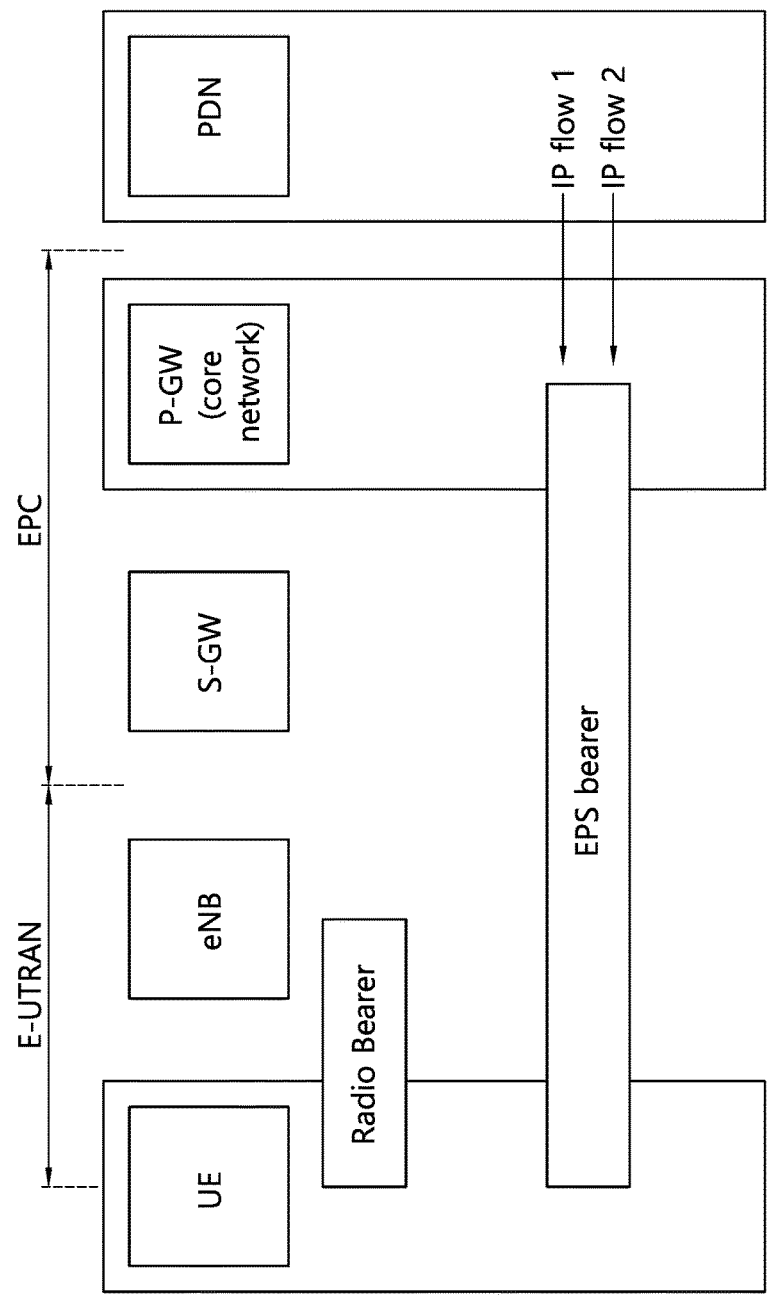
FIG. 9 illustrates a bearer in an LTE network.

FIG. 9 illustrates a bearer in an LTE network.

Referring to FIG. 9, an E-UTRAN is a network between UE and an eNB, and an EPC includes an S-GW and a P-GW.

IP packets generated by a user are referred to as an IP flow. The IP flow is connected/transmitted/received to/from a packet data network (PDN) through the P-GW of an LTE network.

When the UE accesses the LTE network, a path from the UE to the eNB, S-GW, and the P-GW is generated, which is called an EPS bearer. Only one EPS bearer is not generated per UE, but a plurality of EPS bearers may be generated depending on the characteristics of each service. For example, an EPS bearer for the Internet, an EPS bearer for VoIP, etc. may be generated. That is, a radio path between the UE and the P-GW is called an EPS bearer. A variety of types of traffic may be transmitted through the EPS bearer. Furthermore, a transmission path between the UE and the eNB is called a radio bearer.

In the present invention, a core network node (e.g., an, MME and the P-GW) responsible for the management and configuration of QoS of the UE may distinguish a normal EPS bearer through LTE from an EPS bearer capable of being served over a WLAN. The EPS bearer capable of being served through LTE may be called a first type bearer, and the EPS bearer capable of being served over a WLAN may be called a second type bearer.

The core network may determine whether it is better to provide services through which type of bearer depending on the QoS level of a service that desires to be received by the UE. For example, the core network may determine whether it has to be served through an LTE network due to QoS requirements having a specific service of a high level or whether there is no problem if it is served over a WLAN due to QoS requirements of a relatively low level, and may determine an optimum bearer type based on a result of the determination. The core network may notify the eNB of the results of the determination/decision.

When the type of EPS bearer is determined, the type of a radio bearer (RAB) mapped to the EPS bearer may be determined. An LTE eNB may distinguish and manage that 1) a specific RAB is a bearer to which services must be provided through LTE (this is called a first type RAB) or 2) a specific RAB is a bearer not having a problem if the bearer is served over a specific network of LTE and a WLAN (this is called a second type RAB).

The second type RAB may be subdivided and managed. For example, a bearer (RAB_type2_WLAN) transmitted through only a WLAN wireless interface and a bearer (RAB_type2_split) transmitted through an LTE wireless interface and a WLAN wireless interface may be distinguished and managed.

Examples to which the present invention is applied are described below.

Figure 10:
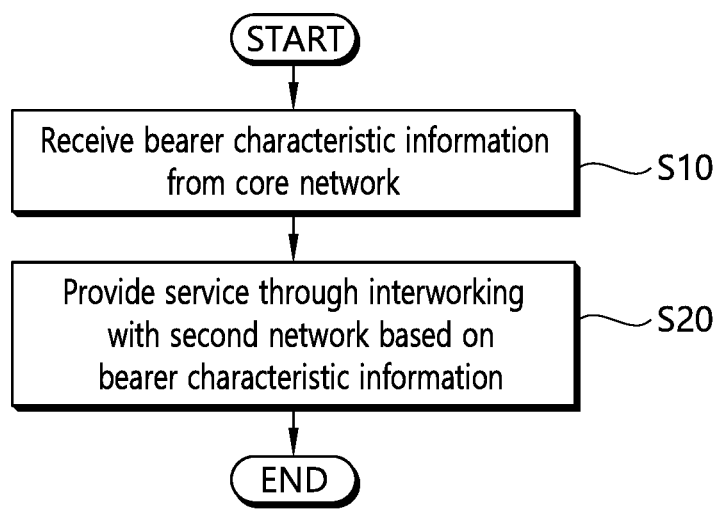
FIG. 10 shows an interworking method of an eNB according to an embodiment of the present invention.

FIG. 10 shows an interworking method of an eNB according to an embodiment of the present invention.

Referring to FIG. 10, the eNB receives bearer characteristic information from a core network (S10).

The bearer characteristic information may include information about whether it is proper to provide a bearer over which one of a plurality of networks, for example, first and second networks. For example, the bearer characteristic information may include at least one of information indicating whether a specific bearer has to be provided by the first network (e.g., an LTE network) capable of providing high QoS or whether the specific bearer has to be provided by the first network or the second network (e.g., a WLAN) capable of providing relatively low QoS and information indicating whether the specific bearer is split and provided by the first network and the second network. The bearer characteristic information may be UE information provided to the eNB in order to provide a proper service to UE connected to the eNB.

The bearer characteristic information may include information about whether it is proper to provide each service/application/APN/PDN connection/IP flow over which one of a plurality of networks in addition to the bearer.

The eNB provides services to the UE through interworking with the second network based on the bearer characteristic information (S20).

For example, a specific one of several programs of specific UE may be charged or the remaining programs may be for free. In this case, QoS of a higher level may be required for traffic of the specific program. Alternatively, QoS may be different depending on the type of service. For example, QoS of a higher level may be necessary for traffic including voice data rather than traffic including Internet data.

The core network may notify the eNB whether it is proper to provide a bearer by which network with respect to each of pieces of traffic by taking into consideration QoS of each of the pieces of traffic through the bearer characteristic information. For example, the core network may notify the eNB that a bearer can be provided by an LTE network or WLAN with respect to traffic including Internet data and can also be split. Furthermore, the core network may notify the eNB that a bearer can be provided by only an LTE network with respect to traffic including voice data.

Accordingly, the eNB may properly determine interworking for each piece of traffic based on the bearer characteristic information.

Figure 11:
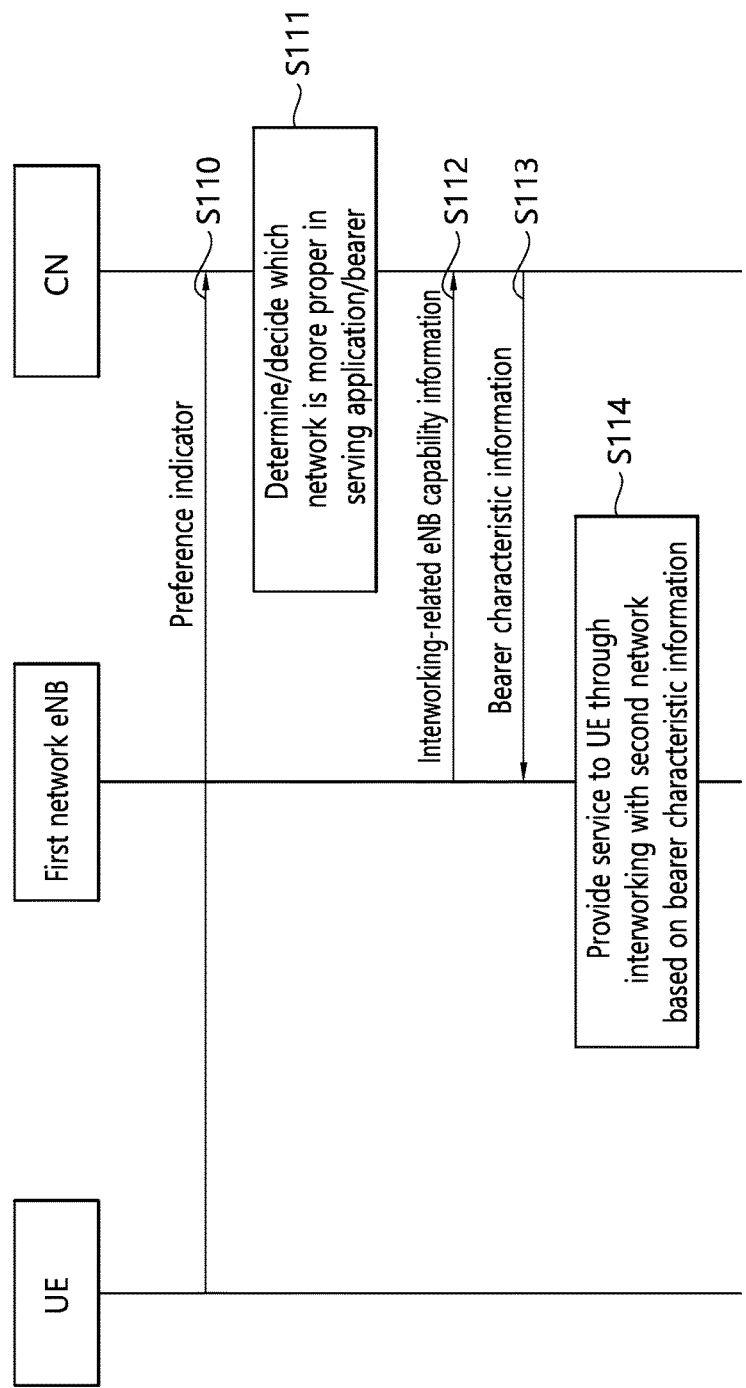
FIG. 11 shows an interworking method according to an embodiment of the present invention.

FIG. 11 shows an interworking method according to an embodiment of the present invention.

Referring to FIG. 11, the UE sends its own preference indicator to the core network (S110). The preference indicator commonly refers to information indicating that the UE prefers that a bearer is provided through which network with respect to a service/application/IP flow)/access point name (APN)/PDN connection/bearer.

For example, the preference indicator may indicate whether a specific service/program has to be served with a bearer according to a first network (LTE). Alternatively, the preference indicator may indicate whether a specific service/program has to be served with a bearer according to the first network (LTE) or a second network (WLAN). Alternatively, the preference indicator may indicate whether a specific service/program has to be served with a bearer according to the second network (WLAN). Alternatively, the preference indicator may indicate whether a specific service/program is allowed to be served through a plurality of split bearers.

In FIG. 11, the UE has sent the preference indicator to the core network, but the present invention is not limited thereto. That is, the UE may send the preference indicator to the eNB of the first network. In this case, the eNB of the first network may transfer the preference indicator to the core network.

The core network determines/decides that which network is more proper in serving the service/application/bearer/IP flow/APN/PDN connection (S111).

The eNB of the first network provides interworking-related eNB capability information to the core network (S112).

The interworking-related eNB capability information may indicate at least one of 1) whether a single bearer may be split over a plurality of networks and 2) whether traffic may be offloaded from one network to the other network, for example. The offloading includes a scheme for offloading, by UE, corresponding traffic to a core network, corresponding to another wireless network, over another wireless network when an eNB sends a command in addition to a method for branching traffic in unit of a bearer/IP flow/PDN connection in a wireless interval.

The core network notifies the eNB of the first network of bearer characteristic information (S113). The bearer characteristic information may notify at least one of the following contents with respect to each service/application/bearer/IP flow/APN/PDN connection, etc.

The bearer characteristic information may indicate 1) whether a specific service/programs/bearer, etc. has to be served according to the first network (LTE), 2) whether a specific service/programs/bearer, etc. has to be served according to the first network (LTE) or the second network (WLAN), 3) whether a specific service/programs/bearer, etc. has to be served according to the second network (WLAN), and 4) whether a specific service/programs/bearer, etc. is allowed to be split into a plurality of bearers.

The eNB of the first network provides services to the UE through interworking with the second network based on the bearer characteristic information (S114).

The eNB of the first network may provide a service/application/bearer/IP flow/APN/PDN connection, etc. over a proper network based on the bearer characteristic information. For example, it is assumed that the bearer characteristic information provides notification that a specific bearer is allowed to be split. In this case, the eNB of the first network may provide traffic corresponding to the specific bearer over both the first network and the second network.

Meanwhile, if handover between a source eNB and a target eNB is generated from the source eNB to the target eNB, the source eNB transfer the preference indicator of the UE and the bearer characteristic information to the target eNB.

Figure 12:
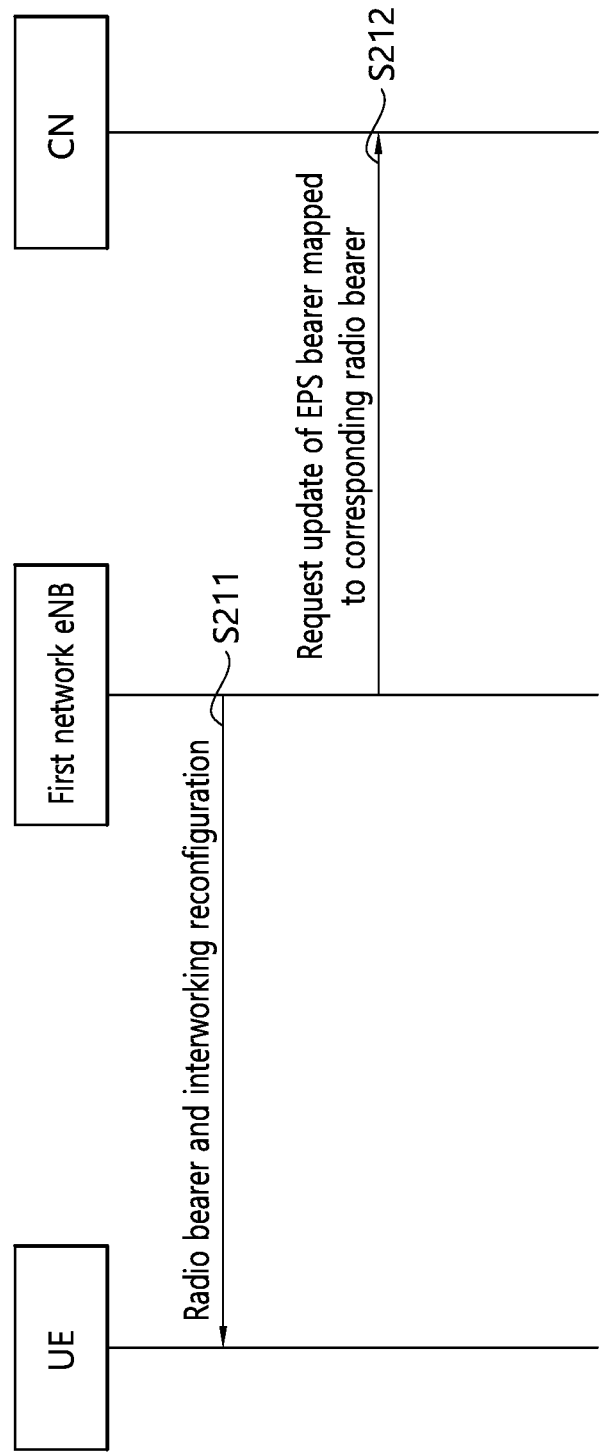
FIG. 12 illustrates a radio bearer and interworking reconfiguration method of an eNB.

FIG. 12 illustrates a radio bearer and interworking reconfiguration method of an eNB.

Referring to FIG. 12, the eNB of the first network performs a reconfiguration on a radio bearer and interworking for UE (S211).

The eNB of the first network requests the update of an EPS bearer, mapped to the corresponding radio bearer, from the core network (S212).

Figure 13:
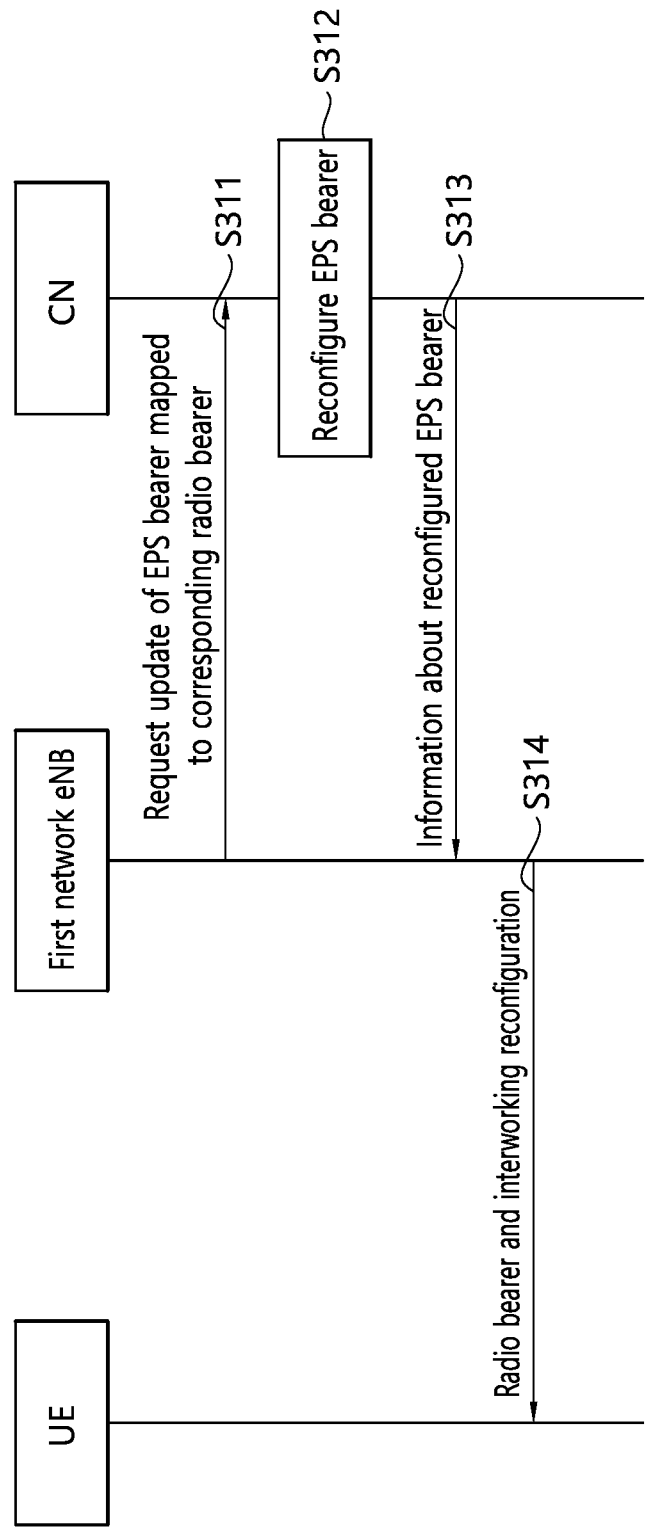
FIG. 13 illustrates another radio bearer and interworking reconfiguration method of an eNB.

FIG. 13 illustrates another radio bearer and interworking reconfiguration method of an eNB.

Referring to FIG. 13, in order to reconfigure a radio bearer and interworking, the eNB of the first network requests the update of an EPS bearer, mapped to the corresponding radio bearer, from the core network (S311).

The core network reconfigures the corresponding EPS bearer (S312).

The core network provides information/parameters about the reconfigured EPS bearer to the eNB of the first network (S313).

The eNB of the first network provides UE with 'radio bearer and interworking reconfiguration' information, including information about the reconfiguration of the radio bearer mapped to the reconfigured EPS bearer and/or an interworking configuration (S314).

FIG. 12 is different from FIG. 13. In FIG. 12, the eNB has provided the UE with the radio bearer and interworking reconfiguration information and then requested the update of the EPS bearer, mapped to the radio bearer, from the core network. In contrast, in FIG. 13, the eNB first requests the update of the EPS bearer, mapped to the radio bearer, from the core network, receives the information about the reconfigured EPS bearer, and provides the UE with the radio bearer and interworking reconfiguration information based on the received information.

The first network and the second network may be generalized as follows. That is, the first network may be a network managed by an eNB in a licensed band, and the second network may be a network managed by an eNB in an unlicensed band.

As described above, in the present invention, a bearer type has been subdivided. An LTE eNB operating in conjunction with a WLAN can take measures capable of improving QoS of UE more easily through procedures, such as a bearer reconfiguration, a QoS parameter reconfiguration, and a radio resource reconfiguration.

FIGS. 14 to 18 illustrate interworking architecture of the first network (LTE) and the second network (WLAN).

Various types of interworking architecture may be used depending on a method in which the APs of LTE and a WLAN operate in conjunction with each other.

Figure 15:
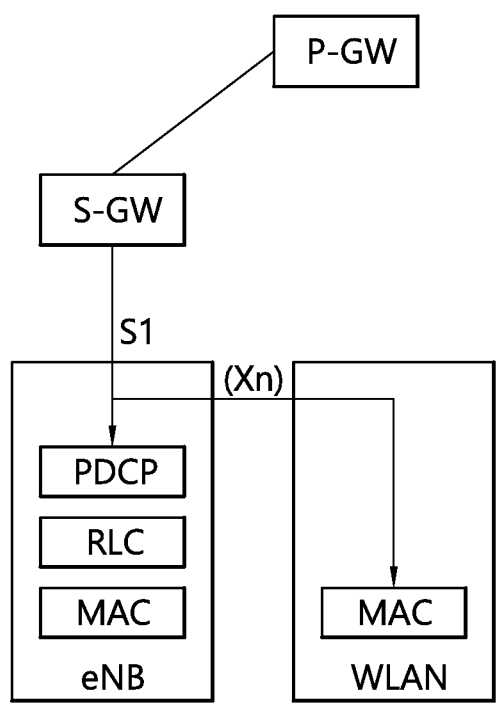

In FIG. 14, traffic is branched in a serving-gateway (S-GW). In FIG. 15, traffic is branched in an eNB. In a method in which traffic is branched at the eNB, traffic may be processed up to the RLC layer of the first network (LTE) and then branched to the second network as in FIG. 16(a), or traffic may be branched before it is processed in the PDCP layer as in FIG. 16(b).

Alternatively, traffic may be processed up to the PDCP layer of the first network (LTE) and then branched to the second network as in FIG. 17(a), or traffic may be branched after it is processed in the RLC layer as in FIG. 17(b).

Figure 18:
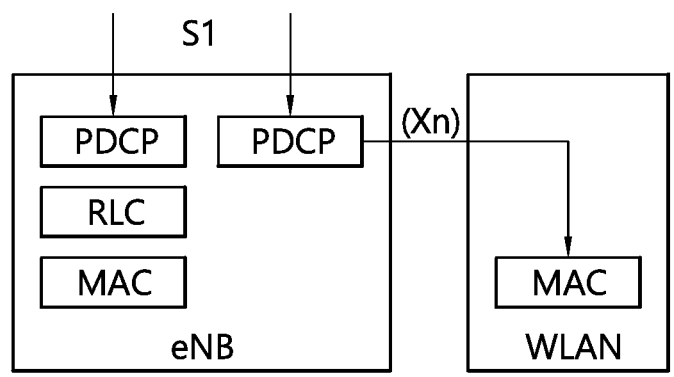

In FIG. 18, traffic is branched after it is processed in the PDCP layer of an eNB. A RLC, MAC layer for second network (WLAN) traffic may not be included in an eNB.

The present invention may also be applied to another interworking architecture in addition to the aforementioned interworking architecture.

Figure 19:
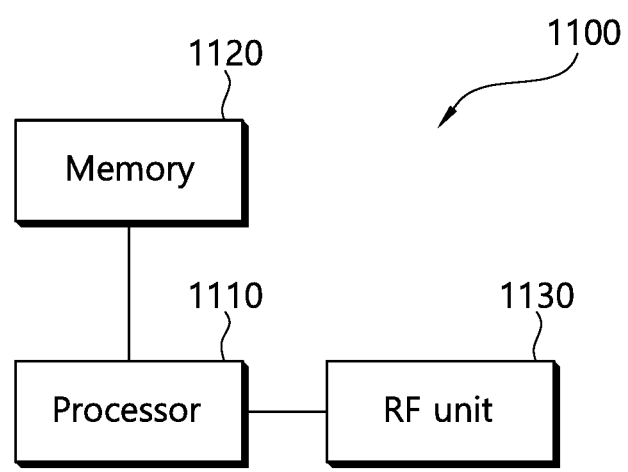
FIG. 19 is a block diagram showing a wireless apparatus in which an embodiment of the present invention may be implemented.

FIG. 19 is a block diagram showing a wireless apparatus in which an embodiment of the present invention may be implemented.

Referring to FIG. 19, the wireless apparatus 1100 includes a processor 1110, memory 1120, and a radio frequency (RF) unit 1130. The wireless apparatus 1100 may operate in a first network (a 3GPP-based access network; LTE/LTE-A).

The processor 1110 implements the proposed functions, processes and/or methods. The processor 1110 may receive bearer characteristic information from a core network (CN), and may perform interworking the eNB of a second network based on the bearer characteristic information. As described above, the bearer characteristic information may include information about whether it is proper to provide a bearer over which one of the first and the second networks.

The RF unit 1130 is connected to the processor 1110 and sends and receives a wireless signal. The RF unit 1130 may include one or more RF units for communication for a 3GPP-based access network and communication for a non-3GPP-based access network.

The processor 1110 may include application-specific integrated circuits (ASICs), other chipsets, logic circuits and/or data processing devices.

The memory 1120 may include read-only memory (ROM), random access memory (RAM), flash memory, memory cards, storage media and/or other storage devices. The RF unit 1130 may include baseband circuits for processing a wireless signal. When an embodiment is implemented in software, the aforementioned scheme may be implemented as a module (process, function, etc.) performing the aforementioned function. The module may be stored in the memory 1120 and executed by the processor 1110. The memory 1120 may be located inside or outside the processor 1110 and connected to the processor 1110 by various well-known means.

What is claimed is:

1. A method for performing interworking, by an eNodeB (eNB) based on a long term evolution (LTE) network, with an access point (AP) based on a wireless local area network (WLAN), the method comprising:
  receiving, from a core network (CN), bearer characteristic information; and
  performing interworking with the AP based on the bearer characteristic information,
  wherein the bearer characteristic information informs the eNB whether a bearer is provided over the eNB or the AP, or the eNB and the AP,
  wherein the bearer characteristic information informs the eNB which type of bearer is used for traffic based on a quality of service (QoS) level of the traffic determined by the CN, and
  wherein when reconfiguration of the bearer and interworking is needed during the performance of the interworking, the eNB transmits reconfiguration request information to the CN.

2. The method of claim 1, wherein the bearer characteristic information informs the eNB whether the bearer is provided over only the eNB.

3. The method of claim 1, wherein the bearer characteristic information informs the eNB whether the bearer is split and provided over the eNB and the AP.

4. The method of claim 1,
  wherein the eNB transmits interworking-related eNB capability information to the core network,
  wherein the eNB receives the bearer characteristic information from the CN in response to transmitting the interworking-related eNB capability information to the CN, and
  wherein the interworking-related eNB capability information supports bearer split in which the eNB provides one bearer over a plurality of networks, and traffic offloading, in which traffic is offloaded from one network to another network.

5. The method of claim 1, wherein when handover is generated, the eNB transfers the bearer characteristic information to a target eNB.

6. The method of claim 1, wherein the CN comprises a packet data network-gateway (P-GW).

7. The method of claim 6, wherein the bearer is a data transmission path between a user equipment (UE) which is served by the eNB and the P-GW.

8. The method of claim 7,
  wherein the UE transmits preference information to the P-GW,
  wherein the UE receives the bearer characteristic information in response to transmitting the preference information to the CN, and
  wherein the preference information informs the eNB that the UE prefers that the bearer is provided over one of the LTE and the WLAN networks.

9. The method of claim 1,
  wherein the LTE network is a network operating in a licensed band, and
  wherein the WLAN is a network operating in an unlicensed band.

10. The method of claim 1, wherein after transmitting the reconfiguration request information to the CN, the eNB receives updated bearer characteristic information.

11. An eNodeB (eNB) of a first network, the eNB comprising:
  a transceiver; and
  a processor, functionally coupled to the transceiver, that:
  controls the transceiver to receive, from a core network (CN), bearer characteristic information, and
  performs interworking with an access point (AP) based on the bearer characteristic information,
  wherein the bearer characteristic information informs the eNB whether a bearer is provided over the eNB or the AP, or the eNB and the AP,
  wherein the bearer characteristic information informs the eNB which type of bearer is used for traffic based on a quality of service (QoS) level of the traffic determined by the CN, and
  wherein when reconfiguration of the bearer and interworking is needed during the performance of the interworking, the eNB transmits reconfiguration request information to the CN.

12. The method of claim 10, wherein after receiving the updated bearer characteristic information, the eNB transmits reconfiguration information including information for reconfiguration of the bearer and the interworking to a UE.

* * * * *